United States Patent [19]

Haan et al.

[11] Patent Number: 5,100,095
[45] Date of Patent: Mar. 31, 1992

[54] BREAKAWAY VEHICLE ACCESSORY MOUNT

[75] Inventors: Theodore M. Haan, Byron Center; Wayne Vandenbrink, West Olive; Larry R. Magnuson, Muskegon; Robert L. Bingle, Holland, all of Mich.

[73] Assignee: Donnelly Corporation, Holland, Mich.

[21] Appl. No.: 662,787

[22] Filed: Mar. 1, 1991

[51] Int. Cl.$^5$ ............................................. F16M 13/00
[52] U.S. Cl. ............................................. 248/549; 248/483; 248/900
[58] Field of Search ............ 248/549, 548, 900, 475.1, 248/481, 483, 484, 478; 350/636

[56] References Cited

U.S. PATENT DOCUMENTS

| Re. 33,249 | 7/1990 | Schneider . | |
|---|---|---|---|
| 1,521,508 | 12/1924 | Denoux . | |
| 1,806,059 | 5/1931 | Hoople . | |
| 2,338,780 | 1/1944 | Poncher et al. . | |
| 2,710,734 | 6/1955 | Haberstump . | |
| 2,923,043 | 2/1960 | Gallagher, Jr. . | |
| 3,044,813 | 7/1962 | Affeldt . | |
| 3,367,616 | 2/1968 | Bausch et al. | 248/483 |
| 3,498,579 | 3/1970 | Vicary . | |
| 3,554,582 | 1/1971 | Yamashita et al. . | |
| 3,589,662 | 6/1971 | Lagrange . | |
| 3,596,867 | 8/1971 | Allander . | |
| 3,599,926 | 8/1971 | Takahashi . | |
| 3,635,435 | 1/1972 | Perison, Sr. | 248/484 X |
| 3,832,075 | 8/1974 | Arai . | |
| 3,853,416 | 12/1974 | Hanan . | |
| 3,887,156 | 6/1975 | Hugonnier . | |
| 4,012,022 | 3/1977 | Tomita . | |
| 4,027,436 | 6/1977 | Daly . | |
| 4,059,360 | 11/1977 | Teissier . | |
| 4,071,217 | 1/1978 | Kongelka . | |
| 4,234,153 | 11/1980 | Chihara . | |
| 4,253,633 | 3/1981 | Takegawa . | |
| 4,284,367 | 8/1981 | Tuson et al. . | |
| 4,394,066 | 7/1983 | Sharp . | |
| 4,436,273 | 3/1984 | Yuda et al. . | |
| 4,524,941 | 6/1985 | Wood et al. . | |
| 4,592,529 | 6/1986 | Suzuki . | |
| 4,626,086 | 12/1986 | Ohyama | 248/549 |
| 4,626,087 | 12/1986 | Ohyama . | |
| 4,632,348 | 12/1986 | Keesling et al. | 248/481 X |
| 4,645,316 | 2/1987 | Ohyama | 248/549 |
| 4,668,059 | 5/1987 | Ohyama | 248/481 X |
| 4,759,620 | 7/1988 | Sakuma et al. . | |
| 4,776,624 | 10/1988 | Sakuma et al. . | |
| 4,919,525 | 4/1990 | Gilbert | 248/549 X |
| 4,930,742 | 6/1990 | Schofield . | |
| 4,936,533 | 6/1990 | Adams et al. | 248/483 X |
| 4,948,085 | 8/1990 | Mittelhauser | 248/549 |
| 4,995,581 | 2/1991 | Koiwai et al. | 248/549 |

FOREIGN PATENT DOCUMENTS 953321 11/1956 Fed. Rep. of Germany .
1555515 11/1969 Fed. Rep. of Germany .
3341611A1 8/1985 Fed. Rep. of Germany .
(List continued on next page.)

Primary Examiner—Ramon O. Ramirez
Attorney, Agent, or Firm—Price, Heneveld, Cooper, DeWitt & Litton

[57] ABSTRACT

A windshield mounted, vehicular accessory mounting assembly is adapted to be small and compact and to reduce occupant injuries upon impact. The assembly includes a base and a coupling member releasably mounted on the base. The coupling member includes a support for mounting a vehicle accessory such as a rearview mirror. A breakaway fastening assembly extends through an aperture in the base to allow separation of the coupling member and vehicle accessory from the base should an impact occur. A series of projections extend between the periphery of the base aperture and the coupling member and are received in corresponding recesses to position the coupling member, provide a stable, three point connection, and prevent its rotation unless it separates from the base. The assembly may also include a swivel support arm to allow adjustment of the accessory position and to further reduce injuries.

42 Claims, 6 Drawing Sheets

FOREIGN PATENT DOCUMENTS

| | | |
|---|---|---|
| 1221699 | 6/1960 | France . |
| 1246937 | 10/1960 | France . |
| 1504689 | 7/1967 | France . |
| 1579530 | 7/1969 | France . |
| 2264685 | 5/1973 | France . |
| 2194166 | 2/1974 | France . |
| 2233826 | 1/1975 | France . |
| 2288490 | 5/1976 | France . |
| 49-48445 | 4/1974 | Japan . |
| 57-55239 | 4/1982 | Japan . |
| 58-24595 | 5/1983 | Japan . |
| 59-164243 | 9/1984 | Japan . |
| 1084850 | 9/1967 | United Kingdom . |
| 1196266 | 6/1970 | United Kingdom . |
| 1196267 | 6/1970 | United Kingdom . |
| 1199108 | 7/1970 | United Kingdom . |
| 1211222 | 11/1970 | United Kingdom . |
| 1214578 | 12/1970 | United Kingdom . |
| 1224875 | 3/1971 | United Kingdom . |
| 1234025 | 6/1971 | United Kingdom . |
| 1384816 | 2/1975 | United Kingdom . |
| 2048803 | 12/1980 | United Kingdom . |
| 2099069 | 12/1982 | United Kingdom . |

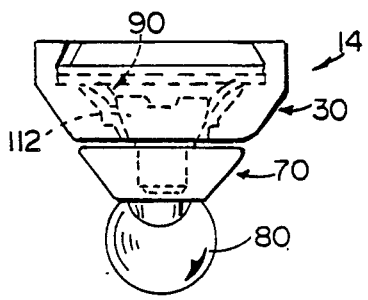
FIG. 13
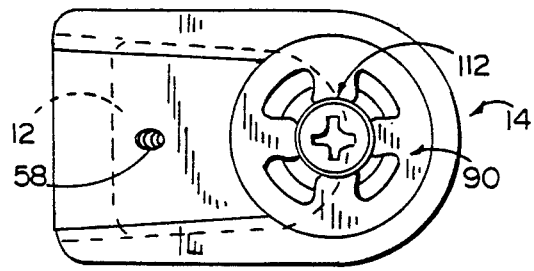
FIG. 14
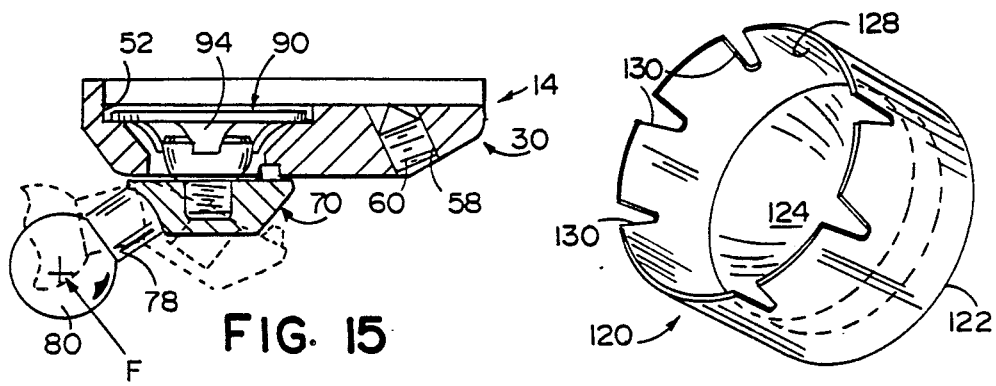
FIG. 15
FIG. 16
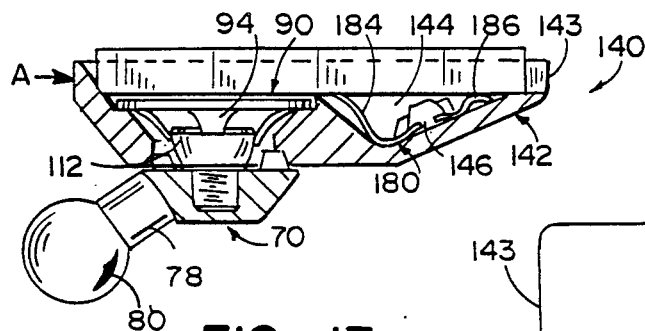
FIG. 17
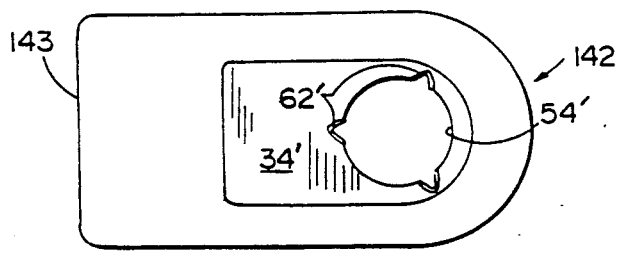
FIG. 18
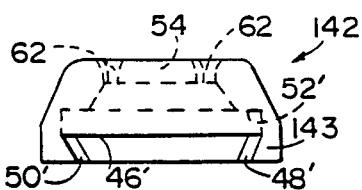
FIG. 19
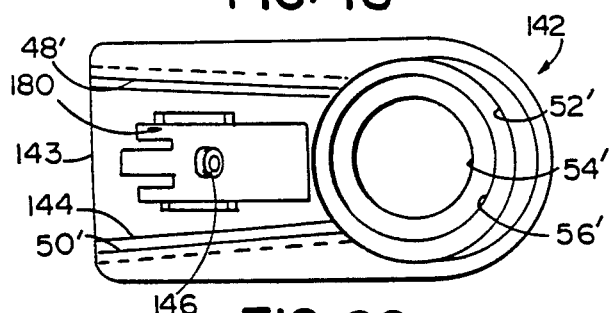
FIG. 20

BREAKAWAY VEHICLE ACCESSORY MOUNT

BACKGROUND OF THE INVENTION

This invention relates to support assemblies for mounting accessories such as rearview mirrors in vehicles and, more particularly, to a vehicular accessory mount adapted to be secured on the inside surface of a vehicle windshield which separates upon impact to reduce occupant injuries, especially in vehicles equipped with inflatable restraining systems or air bags.

Vehicle interior accessories used by the driver are commonly secured to either the header area near the top of the front windshield or directly to the inside surface of the windshield in the forward vision area of the driver. During accidents or sudden stops, if the driver or front seat occupants are thrown forwardly, serious injury can result from striking the accessory or its support system. Consequently, many different supports have been proposed in the past to allow the accessory, such as a rearview mirror, to release and separate from its mounting if impacted.

More recently, inflatable restrain systems, commonly known as air bags, have been incorporated in the instrument panel area of many vehicles. Such systems include flexible plastic bags which are rapidly inflated with pressurized air or gas in a fraction of a second to provide a cushion preventing serious injury to the front seat occupants. However, the use of inflatable restraint systems has created new problems with conventional designs for interior rearview mirrors and other vehicle accessories. For example, during inflation, an air bag can strike the rearview mirror when mounted adjacent the interior windshield surface and either tear the bag and destroy its effectiveness or actually break the rearview mirror from its mount due to the force of the inflation thereby leaving sharp objects protruding from the broken assembly which can themselves injure passengers.

If the inflation of the air bag does not create problems, the final position of the air bags might. Normally two inflatable bags are provided, one on each side of the front of the vehicle compartment. When inflated, the bags usually engage one another in the center of the vehicle, generally in the area of the rearview mirror. If thrown forwardly against the bags, a front seat occupant can be funneled toward the boundary between the inflated bags and thus directly into the rearview mirror, especially if seated in the center of the vehicle. Also, the inflated bags can sometimes trap the mirror and prevent the mirror from properly releasing to prevent injuries. Thus, prior known accessory/rearview mirror mounts have not functioned properly with inflatable restraint systems or have actually created additional dangers within the vehicle passenger compartment.

In addition, the size and complexity of prior known breakaway mirror mounting assemblies has often made them undesirable. Further, many of the prior known mounting assemblies are totally destroyed when they are impacted thereby preventing their reuse and causing increased expense. Also, many prior known mounting assemblies have prematurely failed under road shocks and vibration, or varying temperature conditions.

Accordingly, the present mounting assembly invention was conceived as a solution for these and other previously encountered problems.

SUMMARY OF THE INVENTION

The present invention provides a windshield mounted, vehicular accessory mounting assembly both reduces occupant injuries if impacted, while avoiding damage or hindrance to the operation of inflatable restraint systems or air bags in vehicles.

In one form, the assembly includes a base having a surface defining an aperture therethrough and means for attaching the base to a windshield mounted securing member. A coupling member is releasably mounted on the base for supporting a vehicular accessory such as a rearview mirror. The coupling member includes a support for mounting a vehicle accessory. Breakaway fastening means are provided on the base and coupling member and extend through the base aperture for releasably securing the coupling member to the base and allowing the coupling member to release and separate from the base upon impact by a force of predetermined magnitude acting on the support. In addition, cooperating means extend between the surface of the base aperture and the coupling member for positioning the coupling member on the base.

In preferred forms of the invention, the cooperating means resist rotation of the coupling member with respect to the base. Specifically, the cooperating means may include a plurality of projections on one of the base and coupling member and corresponding recesses which receive the projections on the other of the base and coupling member. Preferably, the projections include camming surfaces which engage the walls of the recesses to move the coupling member away from the base member if the coupling member is rotated upon impact thereby separating the coupling member from the base. The breakaway fastening means will also release when the support on the coupling member receives an impact force tending to pivot or rock the coupling member toward its circumferential edge.

In other aspects, the assembly may include a support arm pivotally joined at opposite ends to the coupling member and to a vehicular accessory such as a rearview mirror. The double pivot support arm helps avoid injury by folding away upon impact until the coupling member is released from the base.

In other aspects, the breakaway fastening means include a headed stud on one of the coupling member and base and a resilient retainer on the other. Preferably, the resilient retainer is a disk-like spring washer which engages the headed stud but allows the stud to pull through flanges in the washer when the coupling member receives an impact of a predetermined force.

As will be understood, the present invention provides numerous advantages over prior vehicular accessory mounting assemblies. It cooperates efficiently with inflatable restraint systems to avoid injurious projections between the air bags after inflation while preventing damage to air bags during inflation. The assembly releases the supported accessory, regardless of whether the impact force strikes the support rotationally, pivotally in a rocking motion, or angles therebetween. When incorporating the double pivot/swivel support arm, the present invention further avoids injury by first folding away upon initial impact and thereafter allowing complete release and separation of the coupling member from the base upon sustained impact of a sufficient magnitude. These improved safety aspects are achieved with a more compact, less complex assembly which eliminates dangerous projections even after the assembly is released during an accident. Moreover, the assembly is durable and resists premature failure or release due to road shocks, vibration, or varying temperatures. If released or separated, the assembly can also be reassembled thereby reducing cost and avoiding the necessity of complete replacement.

These and other objects, advantages, purposes and features of the invention will become more apparent from a study of the following description taken in conjunction with the drawings.

BRIEF DESCRIPTION OF THE DRAWINGS

FIG. 13 is a bottom end elevation of the mounting assembly of FIG. 12;

FIG. 14 is a rear plan view of the assembly of FIGS. 12 and 13;

FIG. 15 is a side view of the assembly of FIGS. 12-14 shown partially in section;

FIG. 16 is a perspective view of a ball cup member forming one of the swivel joints in the support arm shown in FIG. 1;

FIG. 17 is a side view, shown partially in section, of a second embodiment of the vehicular accessory mounting assembly of the present invention;

FIG. 18 is a front plan view of the base of the assembly of FIG. 17;

FIG. 19 is a bottom end view of the base of FIG. 18;

FIG. 20 is a rear plan view of the base of FIG. 18;

DESCRIPTION OF THE PREFERRED EMBODIMENTS

Figure 1:
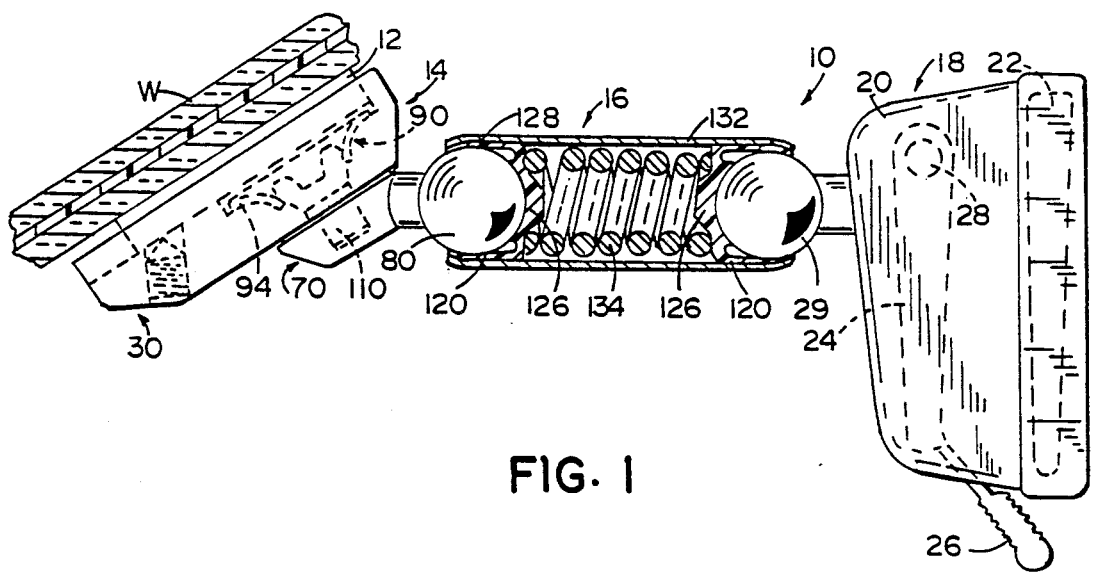
FIG. 1 is a side elevation of a first embodiment of the windshield mounted, vehicular accessory mounting assembly of the present invention incorporating a double swivel support arm shown in section and a typical vehicular rearview mirror all as mounted on the inside surface of a front windshield.

Referring now to the drawings in greater detail, FIG. 1 illustrates a first embodiment 10 of the vehicular accessory mounting assembly with double pivot swivel arm of the present invention. Preferably, assembly 10 is attached to the inside surface of a front vehicle windshield W such that the assembly is supported at an upwardly inclined angle as illustrated. The assembly includes an elongated securing member 12 adhered to the glass windshield surface by a layer of conventionally known metal to glass adhesive such as polyvinylbutyral available from MonSanto company of St. Louis, Miss. The vehicular accessory mounting assembly 14 is slidably received over securing member 12 and includes an outwardly extending ball member 80 which adjustably supports rearview mirror mounting arm 16 and a rearview mirror assembly 18 thereon in cantalivered fashion such that they project into the vehicle passenger compartment for use by the vehicle driver.

A typical rearview mirror assembly 18 includes a molded plastic or other mirror case 20 enclosing a prismatic mirror element 22 having nonparallel front and back surfaces and a reflective layer on the back surface. A pivotable actuator 24 manually operated by lever 26 pivots the case 20 and mirror element 22 about pivot shafts 28 between day and night reflective positions in a conventionally known manner. In the day position, substantially all of the light entering the vehicle from the rear is reflected to the eyes of the driver. In the night position, only a significantly reduced amount of light is so reflected thereby reducing glare and improving the driver's night vision. Rearview mirror assembly 18 is supported on mounting arm 16 by means of a second ball member 29 extending outwardly from the rear area of case 20 on a stud connected to actuator 24. Of course, various other types of mirrors including electro-optic can be supported with the invention, including those with added features such as interior lights, compasses and the like. Mirror assembly 18 is but one example of an accessory supported by the present invention.

As is also shown in FIG. 1, vehicle accessory mounting assembly 14 includes a base member 30 slidably mounted on securing member 12, a coupling member 70 from which ball member 80 extends, and a breakaway fastening assembly including a disk-like spring washer 90 and headed stud or securing fastener 110 which releasably retain coupling member 70 on base 30. Should rearview mirror assembly 18 and/or mounting arm 16 be struck during an accident, coupling member 70 will pivot away from base 30 causing headed stud 110 torrelease from spring washer 90 thereby absorbing the impact energy, preventing permanently obstruction, and avoiding severe injury to the driver or passenger.

As shown in FIGS. 1 and 14, windshield securing member 2 is a generally planar, elongated body preferably formed from sintered stainless steel, although other metals, plastics and forming processes could also be used. The body includes generally planar front and rear surfaces, a rounded top edge, a generally planar bottom edge, and converging, inclined opposing side surfaces as are conventionally known. The rear surface is substantially planar over its entire extent and is adapted to be adhered by the conventionally known metal to glass adhesive mentioned above to the inside surface of glass windshield W in a vehicle. The side surfaces are preferably inclined inwardly toward one another and toward the rear surface for retaining base 30 thereon as described hereinafter. The side surfaces also converge toward the top end such that a double tapered, locking arrangement for the base on the securing member is provided.

Figure 2:
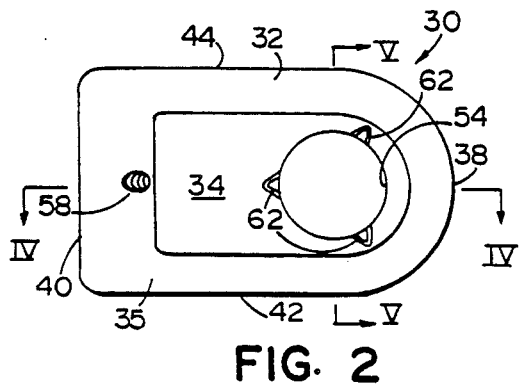
FIG. 2 is a front plan view of the base of the mounting assembly shown in FIG. 1.
Figure 3:
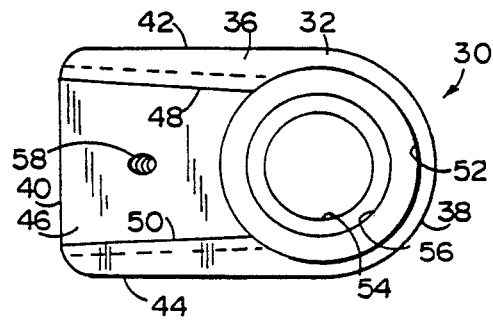
FIG. 3 is a rear plan view of the base of FIG. 2.
Figures 4, 5:
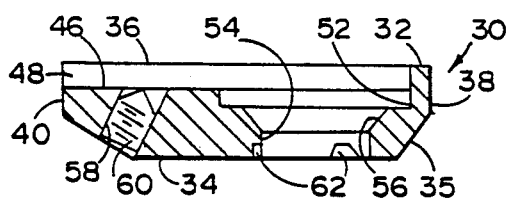
FIG. 4 is a side sectional view of the base taken along plane IV—IV of FIG. 2.
FIG. 5 is a sectional end view of the base taken along plane V—V of FIG. 2.

As shown in FIGS. 2-5, base 30, also known as a "channel mount", is preferably formed from zinc or other relatively soft cast metal although other materials including plastics and other forming processes could also be used. Base 30 includes an elongated, outwardly protruding, body 32 including front and rear surfaces 34, 36, a curved top edge surface 38, a planar bottom edge surface 40 and generally parallel side edge surfaces 42, 44. A beveled surface 35 extends between the top, bottom and side edge surfaces and the front surface 34. On the rear side of body 32 is an elongated, windshield securing member receiving slot or channel 46 defined by inwardly angled channel walls 48, 50 which converge toward the top end 38 as shown in FIGS. 3 and 5. Walls 48, 50 provide a double taper which retains securing windshield securing member 12 in place as shown in FIG. 14.

Adjacent top end 38 of base 30 is a circular recess 52 sunk within channel 46. A circular aperture 54 extends between recess 52 and front surface 34. Aperture 54 widens in a conical portion 56 and is concentric with recess 52 and the semi-circular top end 38. Channel walls 48, 50 merge with the circular wall defining recess 52 as shown in FIGS. 3 and 4. A threaded aperture (FIGS. 2-4) extends substantially perpendicularly to beveled surface 35 from that surface to channel slot 46 approximately midway between side walls 42, 44. Aperture 58 receives a set screw 60 which may be tightened against windshield securing member 12 when base 30 is received thereover.

As is best seen in FIGS. 2, 4 and 5, a series of three equally spaced recesses 62 is formed in the surface defining base aperture 54. Each recess opens to front surface 34 and is generally triangular and tapered such that its side walls converge inwardly toward the truncated bottom which is narrower than the opening of each recess. Recesses 62 are adapted to receive corresponding projections from coupling member 70 such that coupler 70 is spaced slightly away from front surface 34 by a small gap as discussed more fully below and as shown in FIGS. 1, 13 and 15.

Figure 6:
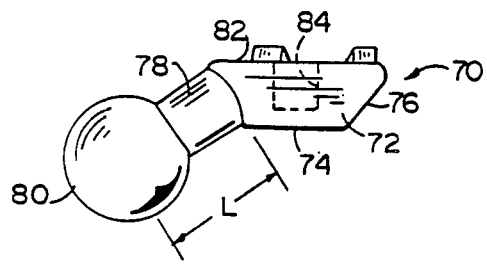
FIG. 6 is a side elevation of the coupling member of the assembly in FIG. 1.
Figure 7:
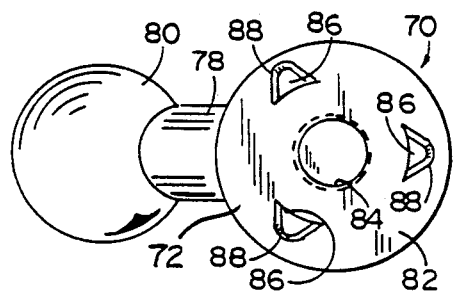
FIG. 7 is a rear plan view of the coupling member shown in FIG. 6.
Figure 8:
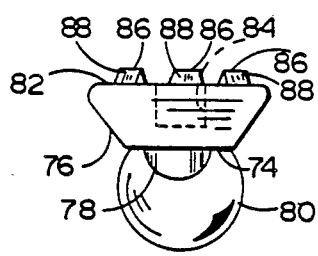
FIG. 8 is an end elevation of the coupling member of FIG. 6.

With reference to FIGS. 6-8, coupling member 70 is preferably also cast from zinc or another soft metal and includes a generally circular, truncated body 72 having a generally planar front surface 74 and a beveled side surface 76. A cylindrical stud or support 78 extends generally perpendicularly to beveled side surface 76 terminating in the solid, spherical ball member 80 forming one of the swivel joints in mounting arm 16 as mentioned above. The rear surface 82 of body 72 is generally planar and includes a centrally located, blind, threaded bore 84 which terminates short of front surface 74. Alternately, bore 84 can extend entirely through body 72 to surface 74. Spaced inwardly from the periphery of body 72 on rear surface 82 are three tapered, truncated projections 86 spaced equally around the periphery of central aperture 84 in positions adapted to correspond to the positions of recesses 62 in base 30. Each projection 86 is generally triangular in cross-section and includes inwardly angled side walls 88 which converge toward the top surface to correspond to the inwardly tapered walls of recesses 62. Positioning projections 86 on the aperture periphery allows the assembly to be small and compact while providing the necessary breakaway functions.

Figure 9:
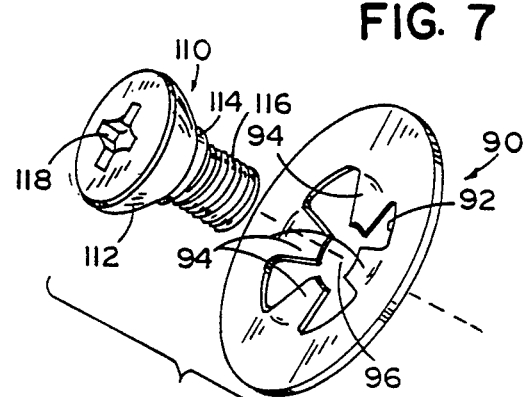
FIG. 9 exploded, perspective view of the spring washer and headed fastener forming the breakaway fastening assembly in the mounting assembly of FIG. 1.
Figure 10:
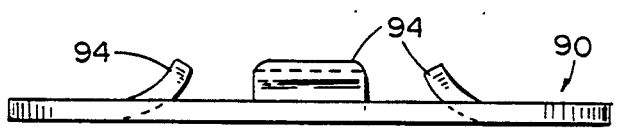
FIG. 10 is a side elevation of the spring washer of FIG. 9.
Figure 11:
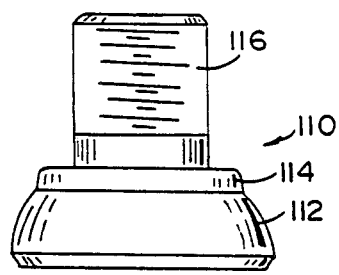
FIG. 11 is a side elevation of the headed fastener of FIG. 9.
Figure 12:
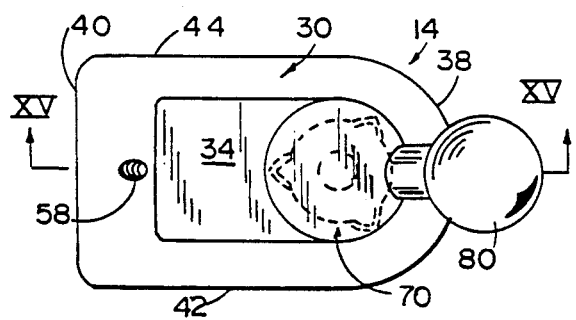
FIG. 12 is a front plan view of the vehicle accessory mounting assembly of FIG. 1.
Figure 21:
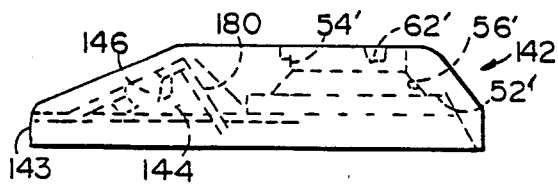
FIG. 21 is a side elevation of the base of FIG. 18.

As shown in FIGS. 9-11, the breakaway fastening assembly includes a resilient, circular, disk-like, spring washer or retainer 90 and a headed fastening screw 110. Spring washer 90 is generally planar and includes a circular central aperture 92 and four resilient spring flanges 94 at equally spaced positions around aperture 92 which extend radially inwardly. Each resilient flange 94 has side edges converging toward the inne free end of the flange providing the flanges with an overall tapered shape. The spring washer 90 is stamped such that flanges 94 are curved inwardly toward one side of the washer (FIG. 10) to provide an opening 96 through which the shaft and head of fastener 110 are received upon manufacture of the mounting assembly.

As shown in FIGS. 9 and 11, threaded fastener 110 includes a rounded, conically shaped head 112, spacing shoulder 114 of slightly smaller diameter than head 112 and a reduced diameter threaded shaft 116. A screwdriver slot 118 is provided for tightening fastener 110 in threaded aperture 84 of coupling member 70.

As shown in FIGS. 1 and 12-15, the vehicular accessory mounting assembly 10 is assembled by inserting screw 60 in threaded aperture 58 and placing spring washer 90 in recess 52 from the rear of base 30 such that resilient spring flanges 94 extend into apertures 56, 54. Next, coupling member 70, which may include mounting arm 16 and rearview mirror assembly 18 already secured around ball member 80, is positioned with its rear surface 72 against the planar front surface 34 in alignment with aperture 54. Projections 86 on the coupling member fit within recesses 62 to position the two parts. When properly engaged, the sidewalls 88 of all three projections 86 are adapted to engage the side walls of the respective recesses 62 such that the top surfaces of the projections are spaced slightly from the bottoms of recesses 62. Such engagement also spaces rear surface 82 slightly away from front surface 34. This provides a stable, wobble-free, three point contact between base 30 and coupling member 70 which avoids the necessity of careful, precise machining of surfaces 82 and to a high degree of flatness. These parts can thus be manufactured more cheaply with less costly machining and finishing.

Thereafter, threaded fastener 110 is inserted from the rear side of base 30 through opening 96 in spring washer 90 and rotated until shaft 116 holds coupling member 70 with projections 86 engaging recesses 62 and surface 82 spaced slightly from front surface 34 as described above and as shown in FIGS. 13 and 15. In this position, the resilient spring flanges 94 of spring washer 90 engage the side surfaces of rounded, conical head 112 to hold the two parts together. The entire assembly may then be slid downwardly over securing member 12 previously adhered to the inside surface of windshield W as shown in FIG. 1. Set screw 60 is then tightened to hold the assembly securely in place.

During use, should a driver or passenger be thrown accidentally against rearview mirror assembly 18, the force transmitted through mounting arm 16 and against spherical ball member 80 will typically travel in the direction of vector F which acts on the center of ball member 80 in a direction generally perpendicular to the axis of support 78 as shown in FIG. 15. If force F is of sufficient magnitude, the resulting torque causes the pivotal motion about the circumferential edge of surface 82 as shown in phantom in FIG. 15. such motion pulls the enlarged head 112 of fastener 110 through the resilient spring flanges 94 thereby releasing the coupling member 70, mounting arm 16 and rearview mirror assembly 18 from base 30 to prevent serious injury. During such action, projections 86 received in recesses 62 act to prevent rotation of coupling member 70 about the axis of threaded fastener 110 on base member 30. For a spring washer formed from spring steel approximately 0.040 inches thick, and support length L (FIG. 6) of approximately 0.50 inches, it has been found that coupling member 70 will release at a force F of about 150 lbs.

However, if force F acts from a side angle against ball member 80 with sufficient magnitude, that force causes the tapered side surfaces 88 of projections 86 and the angled walls of recesses 62 to act as cam surfaces and urge the coupling member 70 outwardly away from front surface 34 and against the resistance force of spring flanges 94. Projections 86 are of sufficient height above rear surface 82 of coupling member 70 such that when their top surfaces are even with front surface 34, enlarged head 112 of fastener 110 will no longer be retained by spring flanges 94, and the coupling member will be released from base 30. Hence, regardless of whether force transmitted through mounting arm 16 acts directly upwardly, downwardly, from the side or at another angle between these directions against coupling member 70, the coupling member will be released from the base member instead of merely rotating about the axis of fastener 110. Thus, a force of sufficient size acting from virtually any direction against support 78 and ball 80 will result in release of the coupling member from the base.

Such release action is also important to the interaction of the present mounting assembly with inflatable restraint systems now available in many vehicles. Inflatable air bags can act against the rear side of rearview mirror assembly 18 as they inflate from the instrument panel area of the vehicle outwardly toward the passengers in the vehicle interior. Should one bag in the front seat area inflate before the other, nonequal forces could act against one side of the rearview mirror or the other. In such case, the forces acting against ball member 80 will either pivot the coupling member directly away from base 30 about one part of the edge of surface 82 or cause it to move rotationally about the axis of fastener 110 which will also separate the coupling member from base 30 as described above. In this fashion, the inflation of the air bags will avoid obstruction by the mounting assembly 10, avoid damage to the inflatable restraint system, and prevent the trapping of the rearview mirror in a fixed position between the inflated air bags where a mirror cannot move and presents a projecting hazard to a passenger thrown thereagainst in an accident.

As shown in FIGS. 1 and 6, mounting arm 16 typically includes a pair of molded plastic ball cups 120 each of which includes a base 122 having an interior spherical surface 124 and an outwardly extending boss 126, as well as a cylindrical side wall 128 divided into flexible segments by inwardly extending slots 130. Ball cups 120 receive ball member 80 from coupling member 70 and ball member 29 from rearview mirror assembly 18 in opposite ends of a surrounding, one-piece tube 132. A coil spring 134 extends between the bottoms of the ball cups and is centered by bosses 126. The plastic ball cups are forced outwardly by spring 134 against the ends of outer tube 132 which is crimped/swaged against flanges 128 and the ball members to retain the assembly together. Accordingly, ball cups 120 enclose a majority of each of the ball members 80, 29 within outer tube 132. Arm 16 thus allows pivotal swiveling movement about each ball member for precise adjustment of the rearview mirror position.

Use of the double pivot/swivel mounting arm 16 also adds to the safety features of mounting assembly 14 by preventing the rigid projection of the support arm into the vehicle interior. In the event of an accident, with impact against rearview mirror assembly 18, a force directed against a rearview mirror from other than directly in line with ball member 80 will cause the mounting arm 16 to fold away from the direction of the force thereby absorbing energy and alleviating serious injury. Continued movement in the direction of the force will cause arm 16 to ultimately reach its maximum pivot angle. Thereafter, continued force causes the coupling member 70 to pivot away from base 30 with enlarged head 112 pulling through spring flanges 94 as described above or to rotate such that projections 86 cam coupling member 70 out of recesses 62 and again pull enlarged head 112 through spring flanges 94.

Figure 22:
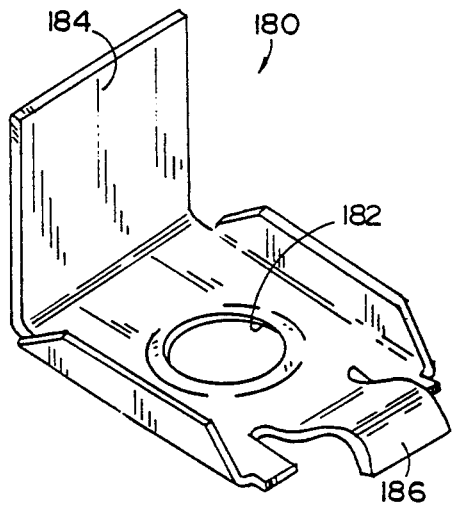
FIG. 22 is a perspective view of the spring retainer incorporated in the base of FIG. 18.
Figure 23:
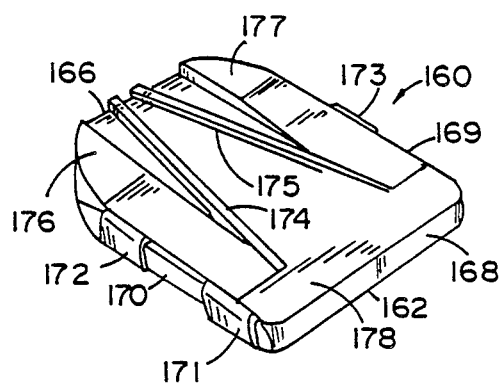
FIG. 23 is a perspective view of a windshield mounted securing member adapted for use with the assembly of FIG. 17.
Figure 24:
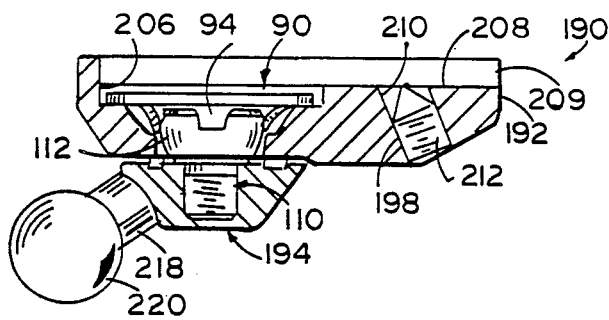
FIG. 24 is a side view, shown partially in section, of a third embodiment of the vehicle accessory mounting assembly of the present invention.
Figure 26:
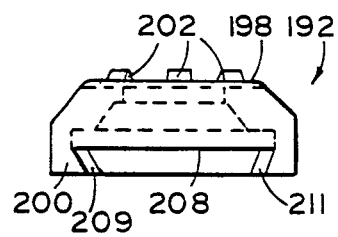
FIG. 26 is a bottom end view of the base of FIG. 25.
Figure 25:
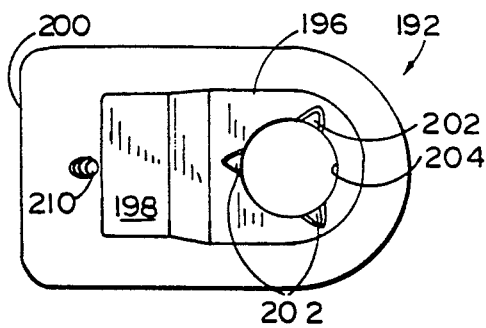
FIG. 25 is a front plan view of the base of the assembly of FIG. 24.
Figure 27:
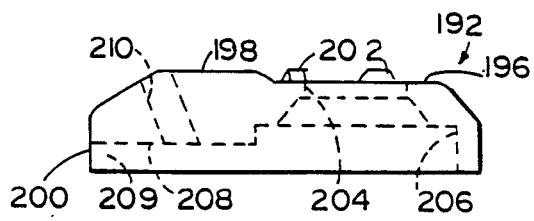
FIG. 27 is a side elevation of the base of FIG. 25.
Figure 28:
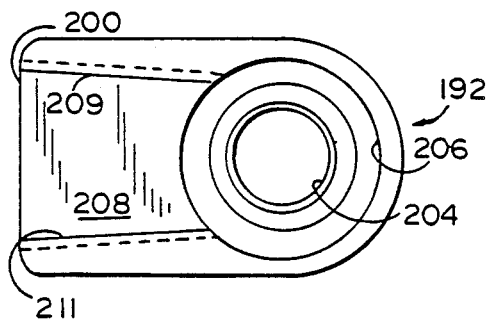
FIG. 28 is a rear plan view of the base of FIG. 25.

Referring to FIGS. 17-23, a second embodiment 140 of the vehicular accessory mounting assembly is illustrated where like numerals indicate like parts to those in assembly 10. Assembly 140 is similar to assembly 10 except for the inclusion of a modified base member 142 which receives a modified windshield securing member 160 (FIGS. 17 and 23). As shown in FIGS. 18-21, base member 142, which is longer than base 30 and has an elongated, beveled front surface, is preferably formed from zinc or another soft cast metal and includes a recessed channel slot 46' forged by inwardly angled, converging side walls 48', 50' on its rear surface. A circular recess 52' receives spring washer 90 while aperture 54', 56' extends through to front surface 34' in the same manner as for base 30. However, within double channel slot 46' is an open chamber 144 receiving spring clip 180 (FIG. 22). Aperture 54' also includes recesses 62' like those in base 30. The bottom wall of chamber 144 includes a cylindrical projection 146 and extends at an angle to the channel slot 46' for receiving spring clip 180. Projection 146 extends through aperture 182 in spring clip 180 and is swaged or formed over to hold the spring clip in place. Spring clip 180 also includes resilient retaining flange 184 and rounded resilient flange 186, both of which engage the exposed surface of windshield securing member as described below.

Windshield securing member 160 (FIG. 23) includes front and back surfaces 162, 164, top and bottom edges 166, 168, and opposing side surfaces 170, 172. Rear surface 162 is substantially planar and is adapted to be adhered to the inside surface of windshield W in the manner shown in FIG. 1. Opposing side surfaces 169, 170 are inclined and converge both toward back surface 162 and toward to edge 166 and include triangularly arranged, raised contact areas 171, 172, 174 for stabilizing the securing member within channel slot 46'. In addition, front surface 164 includes ribs 178, 179 which diverge toward bottom end 168, are tapered in section, and have planar top surfaces. Front surface 164 also includes spaced, sliding contact areas 176, 177, 178 for stable contact with the bottom surface of channel slot 46' adjacent channel slot walls 48', 50. Chamber 144, securing member 160 and spring clip 180 are of the type disclosed in commonly owned U.S. Pat. No. 4,936,533, the disclosure of which is hereby incorporated by reference herein.

As will now be understood from FIGS. 17–23, after windshield securing member 160 is secured to the inside surface of windshield W, a coupling member 70 is mounted on base 142 using spring washer 90 and fastener screw 110 in the manner described for assembly 14. Base 142 with spring clip 180 mounted therein is then slidably assembled over securing member 160. The bottom edge 143 of base 142 is substantially aligned with top edge 166 of securing member 160 such that the sides 169, 170 are received in and along channel walls 48', 50'. Base 142, with any rearview mirror or other accessory attached thereto, is then slid downwardly in the direction of arrow A in FIG. 17 with sliding contact areas 176, 177, 178 engaging the bottom of channel slot 46' until raised contact areas 171, 172, 173 on opposed side surfaces 169, 170 firmly engage inclined walls 48', 50'. At the same time, rounded upper surface of retaining arm 186 rides up and over the edge 166 of base 142 and downwardly along the base to surface 178. The sharp corner on the edge of resilient flange 184 of spring clip 180 rides up and over end 166 of securing member 142 and slides along the top surfaces of ribs 174, 175. Regardless of where base 142 comes to rest on securing member 160, a fresh section of the sharp corner of flange 184 of spring clip 180 will engage ribs 178, 179 because they are divergent. Second retaining arm 186 urges base 142 away from securing member 160 at a distance spaced from the position at which resilient arm 184 contacts ribs 174, 175. This avoids longitudinal rocking of the base on the support member and urges contact areas 171, 172 and 173 tightly against the walls 48', 50' and flange 184 tightly against ribs 174, 175. Withdrawal of the base 142 from securing member 160 is prevented until a thin tool such as a small screwdriver or other implement as shown in U.S. Pat. No. 4,936,533 is slidably inserted in slot 46' from the bottom end 143 of base 142 to disengage flange 184 from the ribs allowing sliding removal.

As shown in FIGS. 24–31, a third embodiment 190 of the vehicle accessory mounting assembly is illustrated where like numerals indicate like parts to those in assemblies 14 and 140. Assembly 190 includes a base 192 preferably formed from zinc or another soft cast metal receiving a coupling member 194 on its front surface 196. Surface 196 is slightly recessed from another section 198 of the front surface which is spaced closer to the bottom edge 200 of base 192. The principal difference between base 192 and base 30 is the inclusion of tapered, truncated, triangular projections 202 spaced equidistantly around aperture 204 which extends through the base from recess 206 which receives spring washer 90 to front surface 196 as shown in FIGS. 24–27.

Projections 202 are substantially similar to projections 86 on coupling member 70 but are shielded by raised front surface section 198 to help to avoid engagement with a passenger or a driver should he or she come in contact with the base 192 after coupling member 194 has separated after an impact. In the same manner as base 30, base 192 includes a substantially similar, double tapered channel slot 208 with inclined, converging in walls 209, 211 adapted to receive windshield securing member 12. A set screw 212 is received in a threaded aperture 210 communicating with the channel slot.

Figure 29:
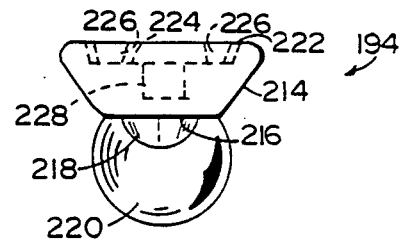
FIG. 29 is an end view of the coupling member of the assembly of FIG. 24.
Figure 30:
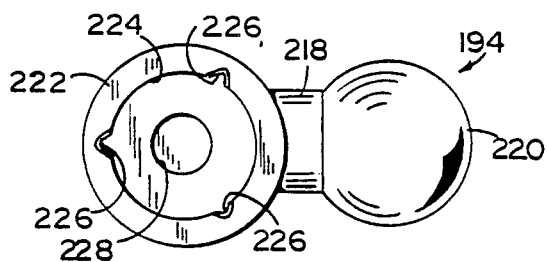
FIG. 30 is a rear plan view of the coupling member of FIG. 29.
Figure 31:
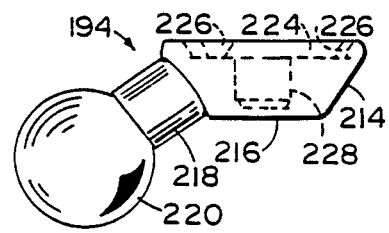
FIG. 31 is a side elevation of the coupling member of FIG. 24.
Figure 32:
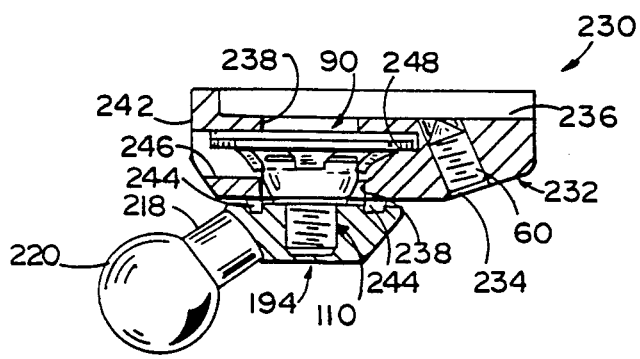
FIG. 32 is a side view, shown partially in section, of a fourth embodiment of the vehicular accessory mounting assembly of the present invention.
Figure 33:
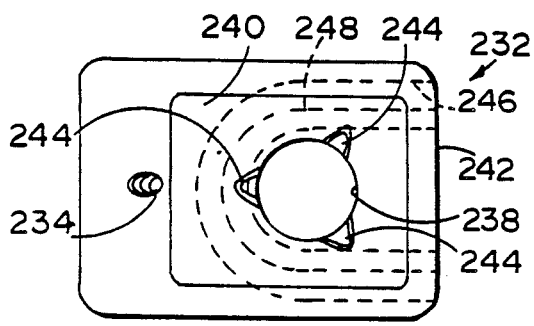
FIG. 33 is a front plan view of the base of the assembly of FIG. 32.
Figure 34:
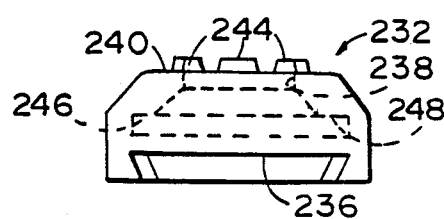
FIG. 34 is a bottom end view of the base of FIG. 33.
Figure 35:
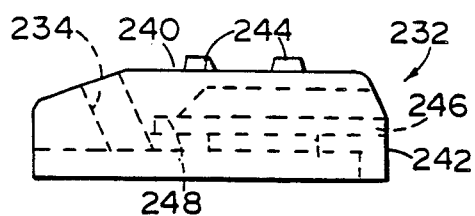
FIG. 35 is a side elevation of the base of FIG. 33.
Figure 36:
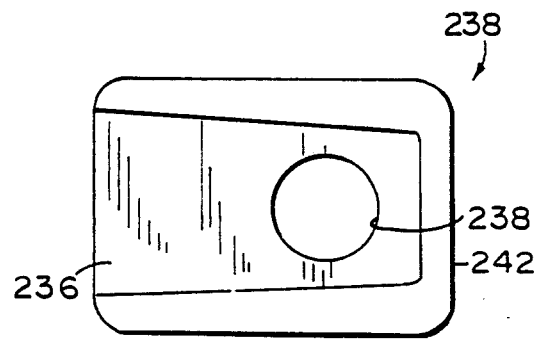
FIG. 36 is a rear plan view of the base of FIG. 33.

As shown in FIGS. 29–31, coupling member 194 is similar to coupling member 70, is also preferably cast from zinc or another soft metal, and includes a truncated body 214, front surface 216, cylindrical support 218, and spherical ball member 220. Instead of projections on the rear surface 222, however, a shallow, circular recess 224 is provided including three tapered, truncated recesses 226 formed in the edges thereof and a centrally located, blind threaded bore 228 for receiving threaded fastener 110. When assembled on base 192, recesses 226 receive projections 202 in the same manner as projections 86 are received in recesses 62 in assembly 14 such that surface 222 is spaced slightly from surface 196. Upon receipt of an impact force of sufficient magnitude, coupling member 194 will pivot on base 192 such that head 112 of threaded fastener 110 is pulled through spring flanges 94 as described for assemblies 14, 140. Likewise, receipt of a rotational impact by ball member 220 will cause projections 202 to cam coupling member 194 axially outwardly of base 192 and also separate the enlarged head 112 from spring flanges 94. Thus, the end result for assembly 190 is the same as for assemblies 14, 140 except that the positions of the projections and recesses are reversed. However, raised front surface 198 in assembly 190 acts as a protective area preventing significant contact with projections 202 after coupling member 194 is released.

A fourth embodiment 230 of the vehicular accessory mounting assembly is shown in FIGS. 32–36 where like numerals indicate like parts to those described above. Assembly 230 uses coupling member 194 as in assembly 190, along with spring flange 90 and threaded fastener 110. However, base 232 is slightly modified to be shorter and thicker. Like bases 30 and 192, base 232 is preferably formed from zinc or another soft cast metal and includes a set screw 60 received in a threaded aperture 234 extending from the beveled surface on the front of the base member to the double tapered channel slot 236 on the rear surface of the base. Channel slot 236 is substantially similar to slot 46 in base 30. Aperture 238 extends from slot 236 to the front surface 240 of the base near the top edge 242. A series of three truncated, tapered, triangular projections 244 spaced equally around aperture 238 on front surface 240 are provided in a manner similar to projections 242 on base 192. The principal difference between base 232 and base 192 is in the mounting of spring washer 90 which is received in slot 246 which opens through the top edge 242 of the base and includes an internal shoulder 248 which supports spring washer 90 through approximately 200° to 220° of its circumference. Accordingly, during assembly, spring washer 90 is slidably inserted through top edge 242 in slot 246 into alignment with aperture 238 after which headed fastener 110 is inserted from slot 236 through the spring washer and secured in coupling member 194 to retain the two parts together with coupling member surface 222 spaced slightly from that surface 240 for mounting on windshield securing member 12 as described above. The breakaway fastening assembly of spring washer 90, headed fastener 110, projections 244 and recesses 226 all operate substantially as described above in connection with the other assemblies.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

What is claimed is:

1. A windshield mounted, vehicular accessory mounting assembly comprising:
   a base including a surface defining an aperture therethrough and means for attaching said base to a windshield mounted securing member;
   a coupling member releasably mounted onsaid base for supporting a vehicular accessory such as a rearview mirror, coupling member including a peripheral edge and a support for mounting a vehicle accessory;
   breakaway fastening means on said base and coupling member and extending through said base aperture on an axis for releasably securing said coupling member to said base and allowing said coupling member to release and separate from said base upon impact by a force of predetermined magnitude acting on said support; and
   cooperating means extending between said surface of said base aperture and said coupling member for positioning said coupling member on said base and for allowing separtoin and release of said coupling member from said base by pivotal movement around said peripheral edge of said coupling member and by camming action when rotated about said axis of said breakaway fastening means.

2. The assembly of claim 1 wherein said cooperating means include means for resisting rotation of said coupling member with respect to said base during said pivotal movement around said peripheral edge.

3. The assembly of claim 2 wherein said cooperating means include a plurality of projections on one of said base and coupling member and corresponding recesses on the other of said base and coupling member receiving said projections, said projections and recesses being spaced equally about the periphery of said base aperture.

4. The assembly of claim 2 including a vehicular rearview mirror and a rearview mirror support arm supporting said mirror, said support arm being pivotally secured to said support on said coupling member.

5. The assembly of claim 4 wherein said support arm includes two ends, said pivotal securement to said support being a pivot joint at one of said ends, said support arm also having a second pivot joint connected to said mirror at the second of said ends.

6. The assembly of claim 5 wherein said support is a spherical ball member on a stud extending outwardly from said coupling member; said support arm including a first socket for receiving said ball member at said one end and a second socket for receiving a second ball member extending from said rearview mirror on a second stud at said other end whereby said support arm includes a pair of swivel joints for adjusting the position of said rearview mirror with respect to said base and coupling member.

7. The assembly of claim 6 wherein said first and second sockets of said support arm each include a ball member receiving ball cup for enclosing a majority of a ball member, a spring extending between said ball cups, and an outer tube holding said ball cups and spring, said tube having two ends with an opening at each end through which said studs respectively extend, each of said openings being smaller than the outer dimension of said tube to retain said ball members and ball cups therein, said spring urging said ball cups and ball members toward said tube ends.

8. The assembly of claim 1 wherein said breakaway fastening means include a headed stud on one of said coupling member and base, and a resilient retainer on the other of said coupling member and base, said resilient retainer engaging said headed stud but releasing said headed stud upon an impact force of predetermined size acting against said support.

9. The assembly of claim 8 wherein said base includes front and back surfaces; said resilient retainer being a spring washer received on said back surface of said base in alignment with said base aperture and opposite to said front surface which engages said coupling member.

10. A windshield mounted, vehicular accessory mounting assembly comprising:
    a base including a surface defining an aperture therethrough and means for attaching said base to a windshield mounted securing member;
    a coupling member releasably mounted on said base for supporting a vehicular accessory such as a rearview mirror, said coupling member including a support for mounting a vehicle accessory;
    breakaway fastening means on said base and coupling member and extending through said base aperture for releasably securing said coupling member to said base and allowing said coupling member to release and separate from said base upon impact by a force of predetermined magnitude acting on said support; and
    cooperating means extending between said surface of said base aperture and said coupling member for positioning said coupling member on said base, said cooperating means including means for resisting rotation of said coupling member with respect to said base comprising a plurality of projections on one of said base and coupling member and corresponding recesses on the other of said base and coupling member receiving said projections, said projections and recesses being spaced equally about the periphery of said base aperture;
    said breakaway fastening means including a headed member extending through said base aperture on an axis; each of said projections including camming surfaces thereon, said recesses including walls engaged by said camming surfaces whereby rotation of said coupling member with respect to said base and about said axis upon impact cams said projections out of said recesses and said coupling member axially away from said base to separate said coupling member from said base.

11. A windshield mounted, vehicular accessory mounting assembly comprising:
    a base including a surface defining an aperture therethrough and means for attaching said base to a windshield mounted securing member;

a coupling member releasably mounted on said base for supporting a vehicular accessory such as a rearview mirror, said coupling member including a support for mounting a vehicle accessory;

breakaway fastening means on said base and coupling member and extending through said base aperture for releasably securing said coupling member to said base and allowing said coupling member to release and separate from said base upon impact by a force of predetermined magnitude acting on said support; and cooperating means extending between said surface of said base aperture and said coupling member for positioning said coupling member on said base, said cooperating means including means for resisting rotation of said coupling member with respect to said base comprising a plurality of projections on one of said base and coupling member and corresponding recesses on the other of said base and coupling member receiving said projections, said projections and recesses being spaced equally about the periphery of said base aperture;

said assembly including three of said projections spaced equally about said periphery of said base aperture, each of said projections including a tapered, truncated member having a triangular cross-section, said recesses including three indentations, each indentation corresponding in shape and position to one of said truncated members, said projections and recesses providing a stable, three point connection between said coupling member and base with the opposite surfaces of said coupling member and base spaced slightly from one another.

12. The assembly of claim 11 wherein said projections are on said coupling member and said recesses are on said base.

13. The assembly of claim 11 wherein said projections are on said base and said recesses are on said coupling member.

14. A windshield mounted, vehicular accessory mounting assembly comprising:
a base including a surface defining an aperture therethrough and means for attaching said base to a windshield mounted securing member;
a coupling member releasably mounted on said base for supporting a vehicular accessory such as a rearview mirror, said coupling member including a support for mounting a vehicle accessory;
a breakaway fastening means on said base and coupling member and extending through said base aperture for releasably securing said coupling member to said base and allowing said coupling member to release and separate from said base upon impact by a force of predetermined magnitude acting on said support;
cooperating means extending between said surface of said base aperture and said coupling member for positioning said coupling member on said base;
said breakaway fastening means including a headed stud on one of said coupling member and base, and a resilient retainer on the other of said coupling member and base, said resilient retainer engaging said headed stud but releasing said headed stud upon an impact force of predetermined size acting against said support;
said headed stud being a screw threaded in said coupling member and extending through said base aperture and having an enlarged head with curved side surfaces; said resilient retainer including a washer having a central aperture and a plurality of spaced, spring flanges extending radially inwardly from the periphery of said central aperture, said spring washer having said central aperture aligned with said base aperture, said flanges each engaging said enlarged head and retaining said coupling member on said base but allowing said enlarged head to pull through said central aperture upon impact received on said support.

15. The windshield mounted, vehicular accessory mounting assembly comprising:
a base including a surface defining an aperture therethrough and means for attaching said base to a windshield mounted securing member;
a coupling member releasably mounted on said base for supporting a vehicular accessory such as a rearview mirror, said coupling member including a support for mounting a vehicle accessory;
breakaway fastening means on said base and coupling member an extending through said base aperture for releasably securing said coupling member to said base and allowing said coupling member to release and separate from said base upon impact by a force of predetermined magnitude acting on said support;
cooperating means extending between said surface of said base aperture and said coupling member for positioning said coupling member on said base;
said breakaway fastening means including a headed stud on one of said coupling member and base, and a resilient retainer on the other of said coupling member and base, said resilient retainer engaging said headed stud but releasing said headed stud upon an impact force of predetermined size acting against said support;
said base including front and back surfaces; said resilient retainer being a spring washer received on said back surface of said base in alignment with said base aperture and opposite to said front surface which engages said coupling member;
said base further including a recessed slot of said back surface for receiving a windshield mounted securing member; said spring washer mounted within a second recess in said recessed slot.

16. The assembly of claim 15 wherein said cooperating means include a plurality of projections on one of said base and coupling member and corresponding recesses on the other of said base and coupling member, said projections and recesses being spaced equally about the periphery of said base aperture.

17. The assembly of claim 15 including a set screw threadably mounted on said base for extension into said recessed slot for engagement with a windshield mounted securing member.

18. The assembly of claim 15 wherein said base includes a resilient spring member for engaging and holding the windshield mounted securing member when received in said recessed slot.

19. A windshield mounted, vehicular accessory mounting assembly comprising:
a base including a surface defining an aperture therethrough and means for attaching said base to a windshield mounted securing member;
a coupling member releasably mounted on said base for supporting a vehicular accessory such as a rearview mirror, said coupling member including a support for mounting a vehicle accessory;

breakaway fastening means on said base and coupling member and extending through said base aperture for releasably securing said coupling member to said base and allowing said coupling member to release and separate from said base upon impact by a force of predetermined magnitude acting on said support;

cooperating means extending between said surface of said base aperture and said coupling member for positioning said coupling member on said base;

said breakaway fastening means including a headed stud on one of said coupling member and base, and a resilient retainer on the other of said coupling member and base, said resilient retainer engaging said headed stud but releasing said headed stud upon an impact force of predetermined size acting against said support;

said base including front, back and peripheral edge surfaces; said resilient retainer being a spring washer mounted on said base in alignment with said base aperture in said slot extending into said peripheral edge of said base.

20. The assembly of claim 19 wherein said base further includes a recessed slot on said back surface for receiving a windshield mounted securing member.

21. The assembly of claim 20 including a set screw threadably mounted on said base for extension into said recessed slot for engagement with a windshield mounted securing member.

22. The assembly of claim 19 wherein said cooperating means include a plurality of projections on one of said base and coupling member and corresponding recesses on the other of said base and coupling member, said projections and recesses being spaced equally about the periphery of said base aperture.

23. A windshield mounted, vehicular accessory mounting assembly comprising:

a base including a surface defining an aperture therethrough and means for attaching said base to a windshield mounted securing member;

a coupling member releasably mounted on said base for supporting a vehicular accessory such as a rearview mirror on said base, said coupling member including a peripheral edge and a support for mounting a vehicle accessory;

a swivel support arm mounted on said coupling member and having two ends with a pivot joint at each end, said support being mounted in one of said two pivot joints, and means for supporting a vehicle accessory such as a rearview mirror on the other of said two pivot joints;

breakaway fastening means on said base and coupling member and extending through said base aperture on an axis for releasably securing said coupling member to said base and allowing said coupling member to release and separate from said base upon impact by a force of predetermined magnitude acting on said support; and cooperating means extending between said surface of said base aperture and said coupling member for positioning said coupling member on said base and for allowing separation and release of said coupling member from said base by pivotal movement around said peripheral edge of said coupling member and by camming action when rotated about said axis of said breakaway fastening means.

24. The assembly of claim 23 wherein said cooperating means include means for resisting rotation of said coupling member with respect to said base during said pivotal movement around said peripheral edge.

25. The assembly of claim 24 wherein said cooperating means include a plurality of projections on one of said base and coupling member and corresponding recesses on the other of said base and coupling member receiving said projections, said projections and recesses being spaced equally about the periphery of said base aperture.

26. The assembly of claim 23 wherein said support is a spherical ball member on a stud extending outwardly from said coupling member; said support arm including a first socket for receiving said ball member at said one end and a second socket for receiving a second ball member extending from a vehicle accessory such as a rearview mirror at said other end whereby said support arm includes a pair of swivel joints for adjusting the position of the vehicle accessory with respect to said base and coupling member.

27. The assembly of claim 26 wherein said first and second sockets of said support arm each include a ball member receiving ball cup for enclosing a majority of a ball member, a spring extending between said ball cups, and an outer tube holding said ball cups and spring, said tube having two ends with an opening at each end through which said support and ball member respectively extend, each of said openings being smaller than the outer dimension of said tube to retain said ball members and ball cups therein, said spring urging said ball cups and ball members toward said tube ends.

28. The assembly of claim 23 wherein said breakaway fastening means include a headed stud on one of said coupling member and base, and a resilient retainer on the other of said coupling member and base, said resilient retainer engaging said headed stud but releasing said headed stud upon an impact force of predetermined magnitude acting against said support.

29. The assembly of claim 23 wherein said base includes front and back surfaces; said means for attaching said base to a windshield mounted securing member including a recessed slot on said back surface for receiving a windshield mounted securing member and fastening means for engaging and holding the windshield mounted securing member when received in said recessed slot.

30. The assembly of claim 23 including a vehicular rearview mirror mounted on said means for supporting a vehicle accessory on the other of said two pivot joints.

31. A windshield mounted, vehicular accessory mounting assembly comprising:

a base including a surface defining an aperture therethrough and means for attaching said base to a windshield mounted securing member;

a coupling member releasably mounted on said base for supporting a vehicular accessory such as a rearview mirror on said base, said coupling member including a support for mounting a vehicle accessory;

a swivel support arm mounted on said coupling member and having two ends with a pivot joint at each end, said support being mounted in one of said two pivot joints, said means for supporting a vehicle accessory such as a rearview mirror on the other of said two pivot joints;

breakaway fastening means on said base and coupling member and extending through said base aperture for releasably securing said coupling member to said base and allowing said coupling member to release and separate from said base upon impact by a force of predetermined magnitude acting on said support; and cooperating means extending between said surface of said base aperture and said coupling member for positioning said coupling member on said base;

said cooperating means including means for resisting rotation of said coupling member with respect to said base comprising a plurality of projections on one of said base and coupling member and corresponding recesses on the other of said base and coupling member receiving said projections, said projections and recesses being spaced equally about the periphery of said base aperture, said assembly including three of said projections each of said projections including a tapered, truncated member having a triangular cross-section, said recesses including three indentations, each indentation corresponding in shape and position to one of said truncated members, said projections and recesses providing a stable, three point connection between said coupling member and base with the opposing surfaces of said coupling member and base spaced slightly from one another.

32. The assembly of claim 31 wherein said projections are on said coupling member and said recesses are on said base.

33. The assembly of claim 31 wherein said projections are on said base and said recesses are on said coupling member.

34. A windshield mounted, vehicular accessory mounting assembly comprising:

a base including a surface defining an aperture therethrough and means for attaching said base to a windshield mounted securing member;

a coupling member releasably mounted on said base for supporting a vehicular accessory such as a rearview mirror on said base, said coupling member including a support for mounting a vehicle accessory;

a swivel support arm mounted on said coupling member and having two ends with a pivot joint at each end, said support being mounted in one of said two pivot joints, and means for supporting a vehicle accessory such as a rearview mirror on the other of said two pivot joints;

breakaway fastening means on said base and coupling member and extending through said base aperture for releasably securing said coupling member to said base and allowing said coupling member to release and separate from said base upon impact by a force or predetermined magnitude acting on said support; and cooperating means extending between said surface of said base aperture and said coupling member for positioning said coupling member on said base;

said breakaway fastening means including a headed stud on one of said coupling member and base, and a resilient retainer on the other of said coupling member and base, said resilient retainer engaging said headed stud but releasing said headed stud upon an impact force of predetermined magnitude acting against said support;

said base including front and back surfaces; said resilient retainer being a spring washer received on said back surface of said base in alignment with said base aperture and opposite to said front surface which engages said coupling member.

35. The assembly of claim 34 wherein said cooperating means include a plurality of projections on one of said base and coupling member and corresponding recesses on the other of said base and coupling member, said projections and recesses being spaced equally about the periphery of said base aperture.

36. A windshield mounted, vehicular accessory mounted assembly comprising:

a base including a surface defining an aperture therethrough and means for attaching said base to a windshield mounted securing member;

a coupling member releasably mounted on said base for supporting a vehicular accessory such as a rearview mirror on said base, said coupling member including a support for mounting a vehicle accessory;

a swivel support arm mounted on said coupling member and having two ends with a pivot joint at each end, said support being mounted in one of said two pivot joints, and means for supporting a vehicle accessory such as a rearview mirror on the other of said two pivot joints;

breakaway fastening means on said base and coupling member and extending through said base aperture for releasably securing said coupling member to said base and allowing said coupling member to release and separate from said base upon impact by a force of predetermined magnitude acting on said support; and cooperating means extending between said surface of said base aperture and said coupling member for positioning said coupling member on said base;

said breakaway fastening means including a headed stud on one of said coupling member and base, and a resilient retainer on the other of said coupling member and base, said resilient retainer engaging said headed stud but releasing said headed stud upon an impact force of predetermined magnitude acting against said support;

said base including front, back and peripheral edge surfaces; said resilient retainer being a spring washer mounted on said base in alignment with said base aperture in a slot extending into the peripheral edge of said base.

37. The assembly of claim 36 wherein said cooperating means include a plurality of projections on one of said base and coupling member and corresponding recesses on the other of said base and coupling member, said projections and recesses being spaced equally about the periphery of said base aperture.

38. A windshield mounted, vehicular accessory mounting assembly comprising:

a base including a surface defining an aperture therethrough and means for attaching said base to a windshield mounted securing member;

a coupling member releasably mounted on said base for supporting a vehicular accessory such as a rearview mirror, said coupling member including a support for mounting a vehicle accessory;

a disk member on said base having a central aperture aligned with said base aperture, said disk member including a plurality of resilient flanges extending into said central aperture;

a headed stud on said coupling member and having an enlarged head projecting through said base aperture and disk member central aperture on an axis such that said resilient flanges engage said enlarged head to releasably hold said coupling member on said base;

a plurality of spaced projections on one of said base and coupling member and corresponding spaced recesses on the other of said base and coupling member receiving said projections, said projections each including camming surfaces thereon, said recesses each including walls engaged by said camming surfaces, said projections each having a length sufficient to prevent retention of said coupling member on said base when engaging said other of said base and coupling member whereby rotation of said coupling member with respect to said base about said axis upon impact by a predetermined force cams said projections out of said recesses and said coupling member axially away from said base to separate said coupling member from said base.

39. The assembly of claim 38 including three projections spaced equally about said surface defining said base aperture, each of said projections including a tapered, truncated stud having a triangular cross-section, said recesses including three indentations, each indentation corresponding in shape and position to one of said truncated studs, said projections and recesses providing a stable, three point connection between said coupling member and base with the opposing surfaces of said coupling member and base spaced slightly from one another.

40. The assembly of claim 38 wherein said projections are on said coupling member and said recesses are on said base.

41. The assembly of claim 38 wherein said projections are on said base and said recesses are on said coupling member.

42. The assembly of claim 38 including a vehicular rearview mirror and a rearview mirror support arm supporting said mirror, said support arm being pivotally secured to said support on said coupling member.

* * * * *

UNITED STATES PATENT AND TRADEMARK OFFICE
CERTIFICATE OF CORRECTION

PATENT NO. : 5,100,095

DATED : March 31, 1992

INVENTOR(S) : Theodore M. Haan et al.

It is certified that error appears in the above-identified patent and that said Letters Patent is hereby corrected as shown below:

Column 3, line 32:
    After "FIG. 9" insert --is an--;

Column 4, line 68:
    "stud 110 tor-" should be --stud 110 to--;

Column 5, line 5:
    "member 2" should be --member 12--;

Column 6, line 26:
    "inne" should be --inner--;

Column 6, line 59:
    Before "to a high" insert --34--;

Column 8, line 3:
    "FIGS. 1 and 6" should be --FIGS. 1 and 16--;

Column 9, line 4:
    "to edge" should be --top edge--;

Column 10, line 36:
    "assembly !90" should be --assembly 190--;

Column 11, line 20:
    "onsaid" should be --on said--;

Column 11, line 22:
    Before "coupling" insert --said--;

Column 11, line 35:
    "separtoin" should be --separation--;

UNITED STATES PATENT AND TRADEMARK OFFICE
CERTIFICATE OF CORRECTION

PATENT NO. : 5,100,095

DATED : March 31, 1992

INVENTOR(S) : Theodore M. Haan et al.

It is certified that error appears in the above-identified patent and that said Letters Patent is hereby corrected as shown below:

Column 13, line 49:
    Before "breakaway" delete --a--;

Column 14, line 11:
    "The" should be --A--;

Column 14, line 21:
    "member an" should be --member and--;

Column 14, line 42:
    "of said" should be --on said--;

Column 16, line 62:
    "said means" should be --and means--.

Signed and Sealed this

Seventh Day of December, 1993

Attest:

BRUCE LEHMAN

*Attesting Officer*     *Commissioner of Patents and Trademarks*